United States Patent
Alderman et al.

(10) Patent No.: US 9,146,840 B2
(45) Date of Patent: Sep. 29, 2015

(54) METHOD AND SYSTEM FOR AUTOMATICALLY DETECTING AND RESOLVING INFRASTRUCTURE FAULTS IN CLOUD INFRASTRUCTURE

(71) Applicant: Cycle Computing, LLC, Greenwich, CT (US)

(72) Inventors: Ian Alderman, Madison, WI (US); Chris M. Chalfant, Fishers, IN (US); Ian Chesal, Santa Clara, CA (US); Douglas Clayton, Durham, NC (US); S. Robert Futrick, Austin, TX (US); Daniel Harris, New Haven, CT (US); Andrew Kaczorek, Carmel, IN (US); Jason Stowe, Greenwich, CT (US); Adrian Johnson, Oakland, CA (US); Ben Watrous, Greenwich, CT (US); David Watrous, Schenectady, NY (US); Archit Kulshrestha, Weehawken, NJ (US)

(73) Assignee: Cycle Computing, LLC, Greenwich, CT (US)

( * ) Notice: Subject to any disclaimer, the term of this patent is extended or adjusted under 35 U.S.C. 154(b) by 179 days.

(21) Appl. No.: 13/919,769

(22) Filed: Jun. 17, 2013

(65) Prior Publication Data
US 2014/0006844 A1 Jan. 2, 2014

Related U.S. Application Data

(60) Provisional application No. 61/660,300, filed on Jun. 15, 2012.

(51) Int. Cl.
*G06F 11/00* (2006.01)
*G06F 11/36* (2006.01)
(Continued)

(52) U.S. Cl.
CPC ........ *G06F 11/3668* (2013.01); *G06F 11/0709* (2013.01); *G06F 11/0793* (2013.01); *G06F 11/36* (2013.01); *G06F 11/3604* (2013.01);
(Continued)

(58) Field of Classification Search
CPC .. G06F 11/36; G06F 11/3604; G06F 11/3668
See application file for complete search history.

(56) References Cited

U.S. PATENT DOCUMENTS

| | | | | |
|---|---|---|---|---|
| 7,743,090 | B1 * | 6/2010 | Gibson et al. | 709/202 |
| 8,863,085 | B1 * | 10/2014 | Stahlberg | 717/124 |
| 8,949,792 | B2 * | 2/2015 | Paterson et al. | 717/124 |

(Continued)

*Primary Examiner* — Joshua P Lottich
(74) *Attorney, Agent, or Firm* — Lucas & Mercanti, LLP; Barry Evans, Esq.; Peter J. Phillips, Esq.

(57) ABSTRACT

Systems and methods are provided for any party in a cloud ecosystem (cloud providers of such resources, the intermediate management software for such resources, and the end user of such resources) to detect and resolve faulty resources synchronously or asynchronously, before said faults adversely affect the users' workloads. The system requests a service or set of one or more resources within a cloud, automatically checking the infrastructure for various faults that would cause it to be non-functional, including pre-defined and user-defined checks, and resolving them before including the infrastructure in the working service cluster of resources. The system presents an API to the user that returns only functional, production-quality resources that are not in a faulty state. An API that tests and resolves bad infrastructure can be registered during the request or a preceding/subsequent API call, removing the need for the end-user to deal with various types of infrastructure faults.

12 Claims, 4 Drawing Sheets

(51) Int. Cl.
*G06F 11/07* (2006.01)
*H04L 12/24* (2006.01)

(52) U.S. Cl.
CPC ........ *H04L 41/5035* (2013.01); *H04L 41/5038* (2013.01); *H04L 41/5096* (2013.01)

(56) References Cited

U.S. PATENT DOCUMENTS

| | | | |
|---|---|---|---|
| 8,996,932 B2* | 3/2015 | Singh et al. | 714/57 |
| 2009/0300423 A1* | 12/2009 | Ferris | 714/38 |
| 2010/0198960 A1* | 8/2010 | Kirschnick et al. | 709/224 |
| 2010/0199130 A1* | 8/2010 | Rolia et al. | 714/37 |
| 2011/0283147 A1* | 11/2011 | Prasad et al. | 714/38.1 |
| 2012/0109869 A1* | 5/2012 | Sahibzada et al. | 706/47 |
| 2012/0210236 A1* | 8/2012 | Prasad | 715/738 |
| 2012/0284696 A1* | 11/2012 | Koskinen | 717/126 |
| 2013/0060933 A1* | 3/2013 | Tung et al. | 709/224 |
| 2013/0080999 A1* | 3/2013 | Yang | 717/124 |
| 2013/0227521 A1* | 8/2013 | Bourd et al. | 717/110 |
| 2013/0238668 A1* | 9/2013 | Subramaniam et al. | 707/803 |
| 2013/0311829 A1* | 11/2013 | Beskrovny et al. | 714/32 |
| 2014/0351796 A1* | 11/2014 | Gur-esh et al. | 717/126 |

* cited by examiner

METHOD AND SYSTEM FOR AUTOMATICALLY DETECTING AND RESOLVING INFRASTRUCTURE FAULTS IN CLOUD INFRASTRUCTURE

CROSS-REFERENCE TO RELATED APPLICATIONS

This application claims the benefit of priority from U.S. Patent Application Ser. No. 61/660,300, entitled "Method and System for Automatically Detecting and Resolving Infrastructure Faults in Cloud Infrastructure," filed Jun. 15, 2012, the contents of which are incorporated herein by reference.

FIELD OF THE INVENTION

The present invention relates to adaptive cloud computing systems, and to a method and system for automatically detecting and resolving infrastructure faults in cloud infrastructure.

BACKGROUND OF THE INVENTION

Cloud computing environments enable the provisioning of infrastructure, platforms, and software, all of them generalized as resources available as a service via an Application Programming Interface (API), most commonly over a network protocol or web service API. When using these cloud resources, there are varying Fault rates in acquiring, as an example, server instances that will run a user's application.

In existing systems, the process of interacting with resource APIs include:

User client application makes an API request that requires resources from a Cloud using the Cloud's API The servers implementing the Cloud API allocate all or part of the resources from the infrastructure available in the Cloud that are required to fulfill the request Once resources are allocated, the request is fulfilled As an example of current systems, a request for server instances or a service that requires server instances to be implemented, can be fulfilled and given to a user. In practice, some of these nodes contain resources that are and are not functioning properly, and would not execute their intended workload due to various potential faults. Specifically, on today's cloud environments 0.5% to 40% Fault rates occur for server instances, which when they occur cause the requested service or the systems that the user is using the resources for to not function properly. This situation becomes a particularly acute problem with larger numbers of requested resources, as even small Fault rates can represent large numbers of faulty resources.

The current art in adaptive cloud infrastructures deals with load (U.S. Pat. No. 8,458,717) and disaster recovery based scenarios (U.S. Pat. No. 8,381,015) without considering the health/viability of infrastructure within the cloud in general. The present invention addresses this shortcoming by disclosing a system and method for running checks and resolving errors in the infrastructure automatically, either as part of management software or cloud provider operations, which allows for efficient rerouting across healthy infrastructure resources.

In one aspect of the invention, software that manages creating individual infrastructure or clusters of infrastructure, responds to a user request for more resources by acquiring them from a cloud provider, checking the resources provided by the cloud provider for faults, resolving them appropriately either through a solution or through requesting new or more infrastructure. Faulty infrastructure may be held on to before requesting new infrastructure, or using scripts to resolve the fault or remove the infrastructure. The client request then receives fully working infrastructure for use.

In another aspect of the invention, the a cloud provider accepts web service requests to acquire virtual machine resource(s) or a platform that is powered by a cluster of virtual machine or bare metal resource(s). After the request for new instances come in, the infrastructure required to respond to the request are either checked and resolved at request time or picked from an asynchronously determined list of healthy resources. The response to the web request or the cluster of resources provisioned to provide a working service would then contain a majority of healthy resources that have been vetted by various checks.

SUMMARY OF THE INVENTION

The invention provides a system and method for any party in the cloud ecosystem, including the cloud providers of such resources, the intermediate management software for such resources, and the end user of such resources, to detect and resolve any faulty resources, from adversely affecting the users' workloads. The invention also relates to outlining the impact to billing for resources that are determined to be erroneous.

The invention provides a system for requesting a service or set of one or more resources within a cloud, automatically checking the infrastructure for various faults that would cause it to be non-functional, including pre-defined and user-defined checks, and resolving them before including the infrastructure in the working service cluster of resources. Additionally, the invention provides a system further reacts to bad server infrastructure in a running computing environment, and removes it from service. Additionally, the invention provides a method for returning the infrastructure that will optimally keep the infrastructure in use below any limits imposed by the provider. The invention provides a system that presents an API to the user that returns only functional, production-quality resources that are not in a faulty state. The invention also provides an API where tests and resolution methods for bad infrastructure can be registered during the request or a preceding/subsequent API call, removing the need for the end-user to deal with various types of infrastructure faults. These systems implement innovative new ways of resolving faulty resources automatically so they do not affect end-user cluster environments, the limits set up by cloud providers, or end-user workloads.

The invention provides:

A process for validating a service or set of one or more resources within a cloud, comprising: automatically checking an infrastructure to detect for any faults including pre-defined and user-defined checks that would cause the infrastructure to be non-functional; resolving any faults that are detected; including the infrastructure in a working service cluster of resources; and presenting to the user only functional resources that are free of faults.

The process may include wherein the step of resolving the fault is performed synchronously. The process may also include wherein the step of resolving the fault is performed asynchronously. The process may also include wherein the process further comprises the step of removing from working service a faulty server infrastructure in a running computing environment.

A process of using management or client software, comprising: receiving resources from a cloud application programming interface that may be non-faulty or faulty; running fault tests against the resources or service to detect for the presence of faults; making the detected faulty resources non-faulty; and communicating the resources to a client application.

The process may include wherein the step of making comprises removing the detected fault. The process may also include wherein the step of making comprises correcting the detected fault.

A process for validating cloud-based resources in order to maintain a list of fault-free resources, comprising: (a) testing the ability to log into an infrastructure server; (b) testing the ability to access a file system within the infrastructure server; (c) alerting the results of steps (a) and (b) back to fault detection and resolution software, in at least one of the Cloud, Management, or Client software; and if a fault is detected in any of steps (a)-(c), performing at least one of (d) holding the resources for examination, (e) ensuring that the same faulty resource is not re-acquired, or (f) shutting down the resource.

The process may include wherein steps (a)-(c) are performed by software run external to the cloud-based resources. The process may also include wherein at least one of steps (a)-(f) is performed synchronously. The process may also include wherein at least one of steps (a)-(f) is performed asynchronously. The process may also include wherein if no fault is detected in any of steps (a)-(c), further including the step of including the server infrastructure in a working server cluster of resources.

A process for returning infrastructure that will keep the infrastructure in use below any limits imposed by the provider.

A system comprising: an application programming interface (API) which tests infrastructure for faults; resolves any faults in the infrastructure; and registers the faulty infrastructure during the request or a preceding/subsequent API call, thereby removing the need for an end-user to deal with infrastructure faults in user-defined fault checks.

A system for validating a service or set of one or more resources within a cloud, comprising an application programming interface (API) which: automatically checks an infrastructure to detect for any faults including pre-defined and user-defined checks that would cause the infrastructure to be non-functional; resolves any faults that are detected; includes the infrastructure in a working service cluster of resources; and presents to the user only functional resources that are free of faults.

The system may include wherein the API performs the step of fault resolution asynchronously.

A system for using management or client software, comprising an application programming interface (API) which: receives resources from a cloud application programming interface that may be non-faulty or faulty; runs fault tests against the resources or service to detect for the presence of faults; makes the detected faulty resources non-faulty; and communicates the resources to a client application.

A system for validating cloud-based resources in order to maintain a list of fault-free resources, comprising an application programming interface (API) which: (a) tests the ability to log into an infrastructure server; (b) tests the ability to access a file system within the infrastructure server; (c) alerts the results of steps (a) and (b) back to fault detection and resolution software, in at least one of the Cloud, Management, or Client software; and if a fault is detected in any of steps (a)-(c), performs at least one of (d) holds the resources for examination, (e) ensures that the same faulty resource is not re-acquired, or (f) shuts down the resource.

The system may include wherein the API performs at least one of steps (a)-(f) synchronously. The system may also include wherein the API performs at least one of steps (a)-(f) asynchronously.

DETAILED DESCRIPTION OF THE INVENTION

A preferred embodiment of a process and system according to the invention will be described, but the invention is not limited to this embodiment. It is understood that the fault check and resolution process performed by the invention may be performed synchronously (e.g., "just in time," JIT) or asynchronously (beforehand). It is also understood that the term "infrastructure," as used in this application encompasses servers and other nodes connected to a cloud computing environment, but it not limited thereto.

Although the present invention has been described in detail, it should be understood that various changes, substitutions and alterations can be made hereto without departing from the spirit and scope of the invention as defined by the appended claims.

Figure 1:
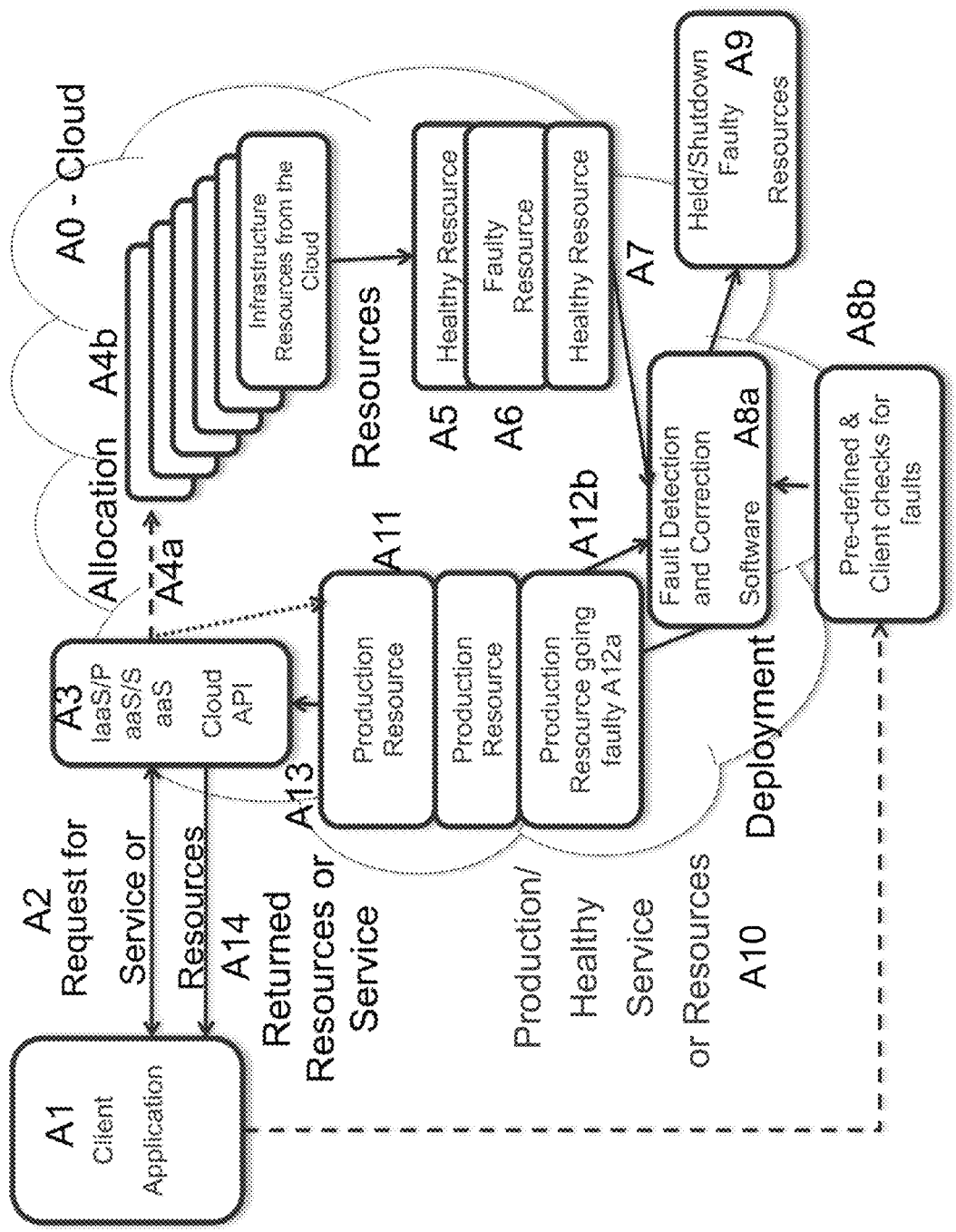
FIG. 1 is a block diagram which shows a process of acquiring resources, where infrastructure is returned only after having been checked for faults.

FIG. 1 shows a system and a depiction of the process of acquiring resources, where infrastructure is returned only after having been checked for faults.

The processes and components in this system are:

The Client Application (A1) sends a request (A2) for a service or set of resources from an IaaS/PaaS/SaaS cloud API (A3). As used here, is understood that: "IaaS" means "Infrastructure as a Service"; "PaaS" means "Platform as a Service"; and "SaaS" means "Software as a Service."

This causes the Cloud (A0) to allocate (A4a dashed-arrow path) resources (A4b), some of which are Healthy (A5) and Faulty (A6).

These resources are passed to a Fault detection and correction software component (A8a) that runs a set of one or more checks against the resources (A8b), some of which are pre-defined for that cloud (A0) and by that client (A1).

Based upon the results of the checks for faults (A8b), the Fault detection and correction software component (A8a) then holds or shuts down the faulty resources (A9) or deploys the healthy infrastructure into a production service or resources (A10). These checks for faults (A8b) may be performed in advance, asynchronously on cloud resources, causing allocation (A4a) to be based on previously checked resources. Allocation (A4a) is represented by a dotted-arrow path.

The Fault Detection and Correction software might notice infrastructure that is going faulty (A12a) through sporadic or periodic checks (A12b), and resolve that as well.

The final Production or Healthy service or resources would be communicated (A13) back to the Cloud API (A3) for subsequent communication (A14) to the Client (A1).

Figure 2:
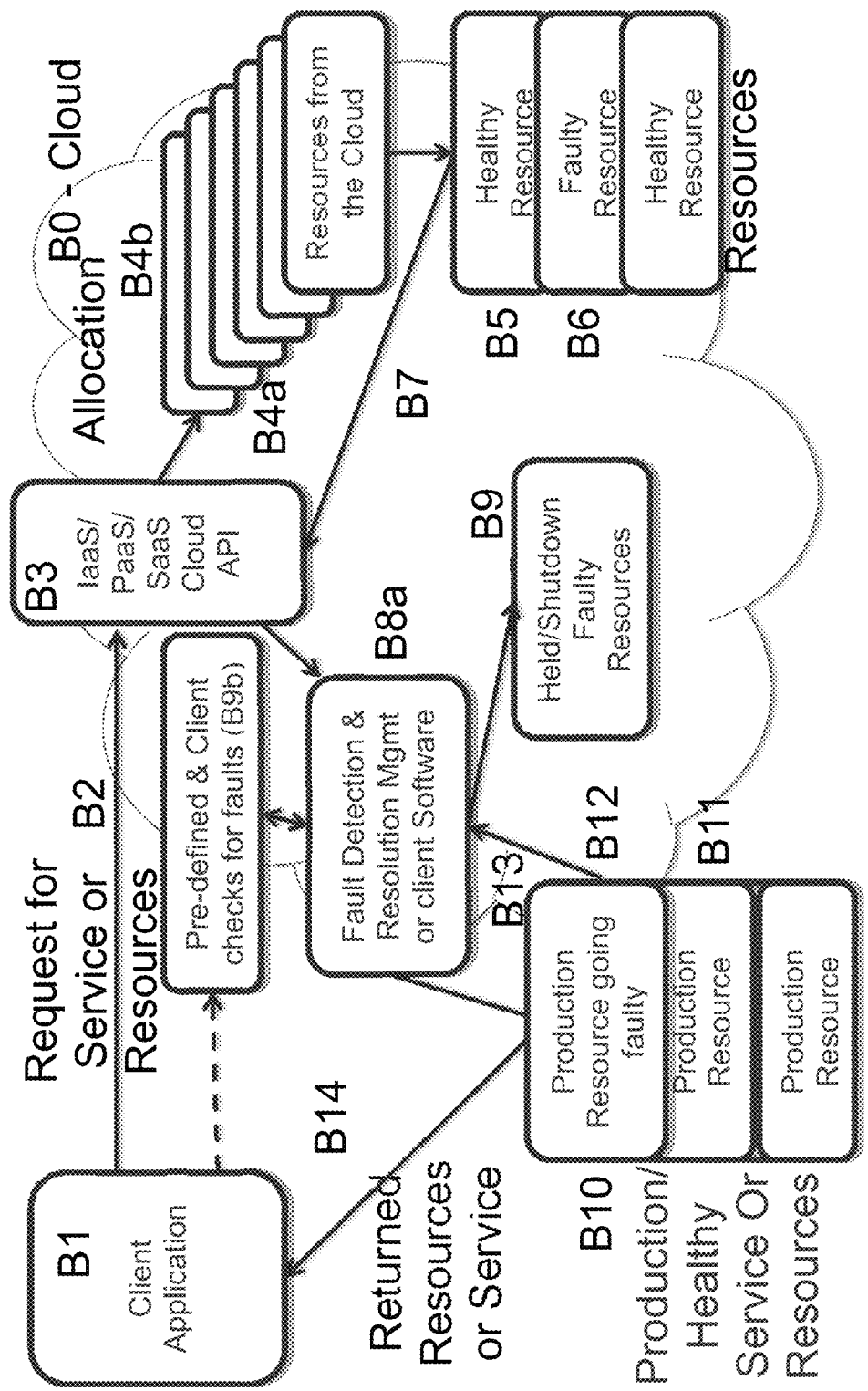
FIG. 2 is a block diagram which shows a process of acquiring resources, where infrastructure is returned only after having been checked for faults.

FIG. 2 show a system and a depiction of the process of acquiring resources, where infrastructure is returned and after having been checked for faults.

The processes and components in this system are:

The Client Application (B1) sends a request (B2) for a service or set of resources from an IaaS/PaaS/SaaS cloud API (B3).

This causes the Cloud (B0) to allocate (B4a) resources (B4b), some of which are Healthy (B5) and Faulty (B6)

These resources are communicated back (B7) to the Cloud API (B3) and presented back to the user facing API, which is communicating with a Fault Detection and Resolution Management or Client software (B8a). The Fault Detection and Resolution Management or Client software (B8a) runs a set of one or more checks against the resources (B8b), some of which are pre-defined for that cloud (B0) and by that client (B1).

Based upon the results of the checks for faults (B8b), the Fault Detection and Resolution Management or Client software (B8a) then holds or shuts down the faulty resources (B9) or deploys the healthy infrastructure into a production service or resources (B10).

The Fault Detection and Correction software might notice infrastructure that is going faulty (B12) through sporadic or periodic checks (B13), and resolve that as well.

The final Production or Healthy service or resources (B10) would be returned back (B14) to the Client (B11) for its use.

Figure 3:
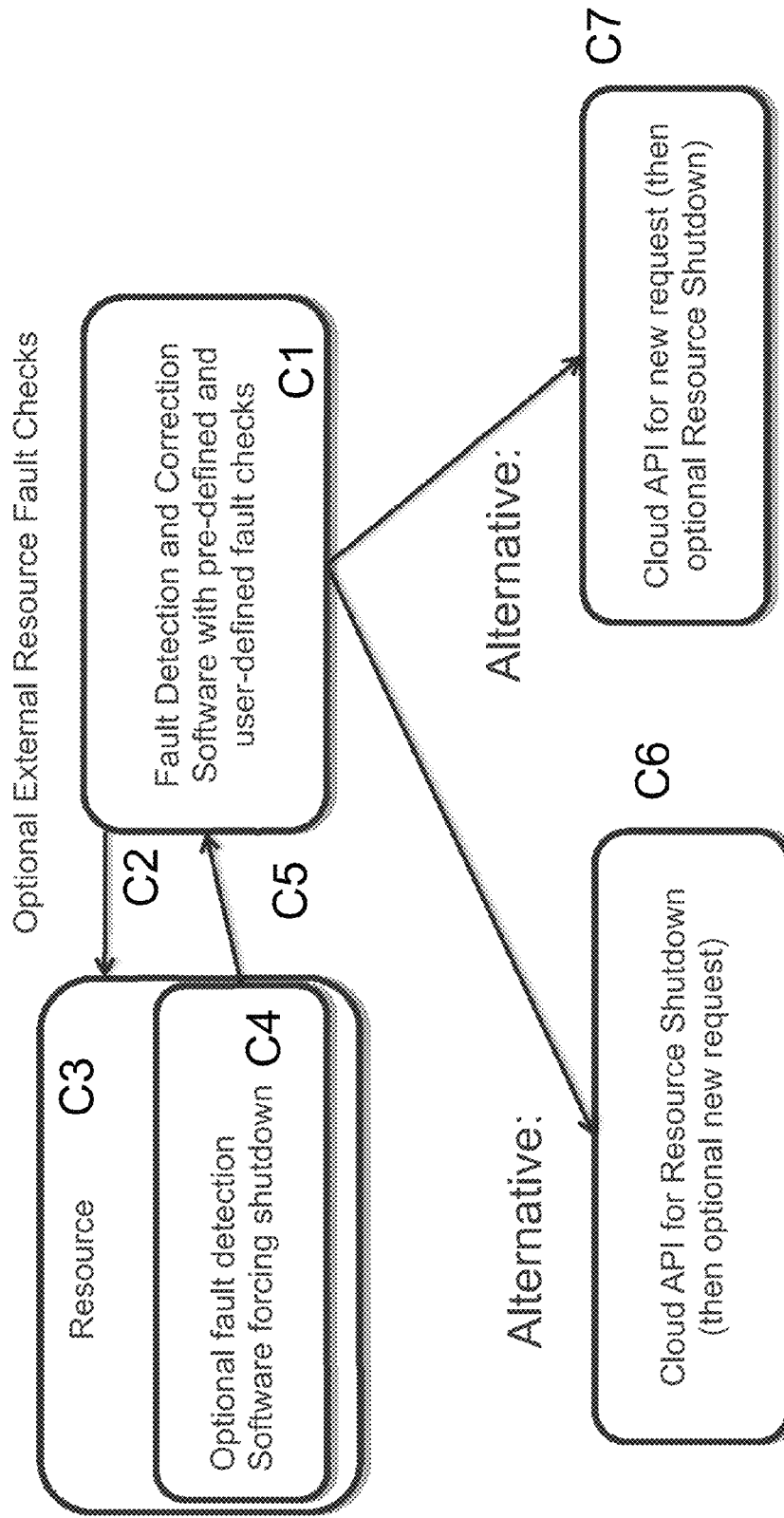
FIG. 3 is a block diagram which shows a process of fault checks.

FIG. 3 shows a depiction of a system and method for checking for faults.

The system and method can include:

Fault detection and correction software with pre-defined and user-defined fault checks (C1) that runs optional external resource fault checks (C2) on the Resource (C3), e.g. test whether resource can be SSH's into without error.

An Optional fault detection software (C4) running in the resource (C3) alerts (C5) the Fault detection and correction software with pre-defined and user-defined fault checks (C1) that the node is faulty or becoming faulty or in a given state. The Fault detection and correction software with pre-defined and user-defined fault checks (C1) the chooses optional actions, including optionally calling the Cloud API for Resource Shutdown (C6) to keep the resources used below the provider limits or the Cloud API for new resource requests, with a subject/optional shutdown.

Figure 4:
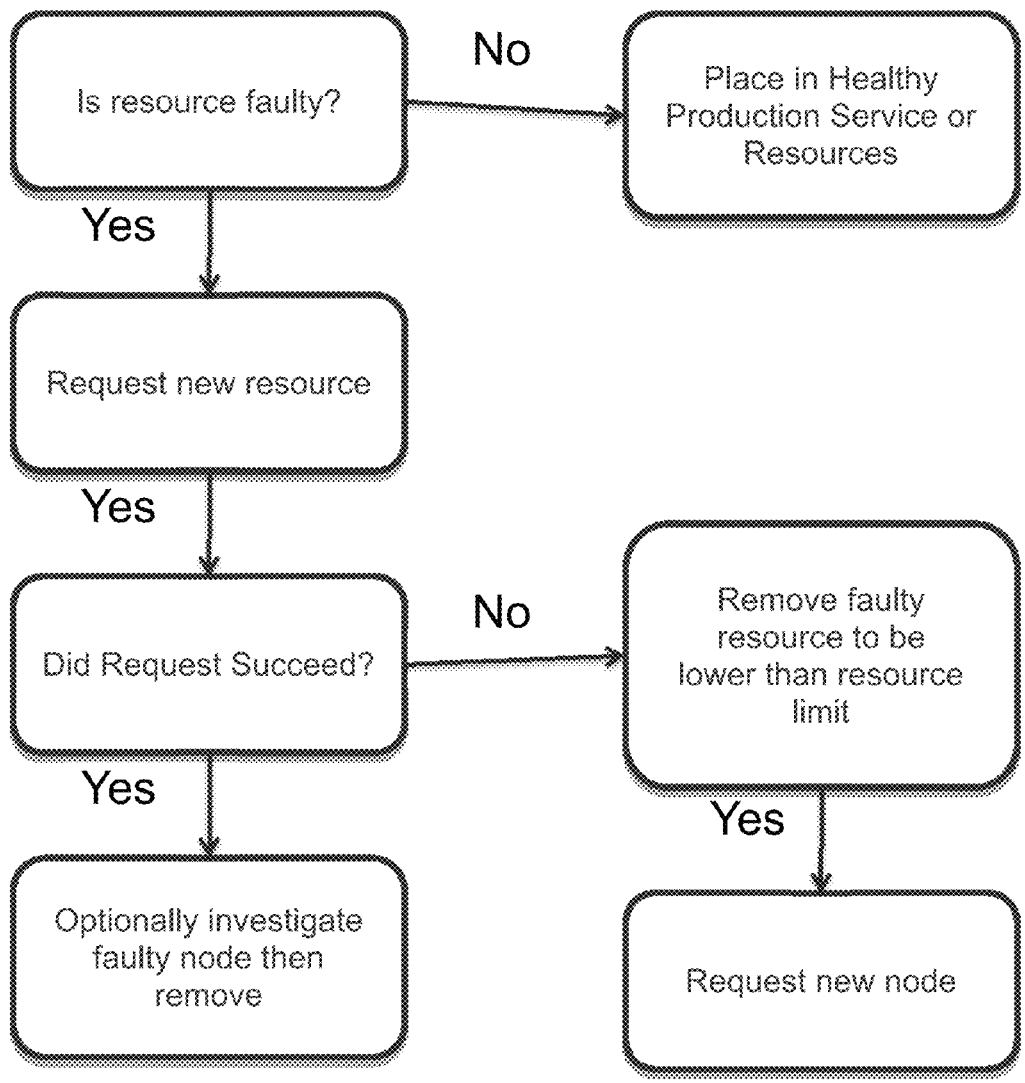
FIG. 4 is a block diagram which shows a process for keeping fault resources for examination without going over resource limits if possible.

FIG. 4 shows a process for keeping fault resources for examination without going over resource limits if possible.

The present invention thus provides:

A system for requesting a service or set of one or more resources within a cloud, automatically checking the infrastructure for various faults that would cause it to be non-functional, including pre-defined and user-defined checks, and resolving them before including the infrastructure in the working service cluster of resources, as shown in FIG. 1 and its description. The Cloud API in this system presents to the user only functional, production-quality resources that are not in a faulty state;

This system further reacts to bad server infrastructure in a running computing environment, and removes it from service (A12) as shown in FIG. 1;

A separate system that uses management or client software to receive resources from the Cloud API that may be healthy or fault, run fault tests against the resources or service, and make them all healthy before communicating them to the Client application, as shown in FIG. 2;

An API, where tests and resolution methods for bad infrastructure can be registered during the request or a preceding/subsequent API call, removing the need for the end-user to deal with various types of infrastructure Faults, as shown in FIGS. 1 & 2 in the user-defined fault checks;

Additionally, a system for running tests against resources, which includes software run external to the resource, e.g. testing the ability to log into a server, and internal to the resource, e.g. testing the ability to access a file system, alerting the status back to the Fault Detection and Resolution software, either in the Cloud, Management, or Client software, and either holding the resources for examination or to make sure the same faulty resource is not re-acquired, or merely shutting down the resource, as depicted in FIG. 3.

Additionally, a method for returning the infrastructure that will optimally keep the infrastructure in use below any limits imposed by the provider, as shown in FIG. 4.

While a preferred embodiment according to the invention has been described, the invention is not limited to this embodiment, and variations and modifications can be made without departing from the scope of the invention. The scope of the invention is defined by way of the following claims.

We claim:

1. A process for validating a service or set of one or more resources within a cloud for a user, comprising:
    automatically checking an infrastructure to detect for any faults including pre-defined and user-defined checks that would cause the infrastructure to be non-functional;
    resolving any faults that are detected;
    including the infrastructure in a working service cluster of resources; and
    presenting to the user only functional resources that are free of faults.

2. The process of claim 1, wherein the step of resolving the fault is performed synchronously.

3. The process of claim 1, wherein the step of resolving the fault is performed asynchronously.

4. The process of claim 1, wherein the process further comprises the step of removing from working service a faulty server infrastructure in a running computing environment.

5. A process of using management or client software, comprising:
    receiving resources from a cloud application programming interface that may be non-faulty or faulty;
    running fault tests against the resources or service to detect for the presence of faults;
    making the detected faulty resources non-faulty; and
    communicating the resources to a client application.

6. The process of claim 5, wherein the step of making comprises removing the detected fault.

7. The process of claim 5, wherein the step of making comprises correcting the detected fault.

8. A process for validating cloud-based resources in order to maintain a list of fault-free resources, comprising:
    (a) testing the ability to log into an infrastructure server;
    (b) testing the ability to access a file system within the infrastructure server;
    (c) alerting the results of steps (a) and (b) back to fault detection and resolution software, in at least one of Cloud, Management, or Client software; and
    if a fault is detected in any of steps (a)-(c), performing at least one of (d) holding the resources for examination, (e) ensuring that a resource in which the fault was detected is not re-acquired, or (f) shutting down the resource.

9. The process of claim 8, wherein steps (a)-(c) are performed by software run external to the cloud-based resources.

10. The process of claim 8, wherein at least one of steps (a)-(f) is performed synchronously.

11. The process of claim 8, wherein at least one of steps (a)-(f) is performed asynchronously.

12. The process of claim 8, wherein if no fault is detected in any of steps (a)-(c), further including the step of including the server infrastructure in a working server cluster of resources.

\* \* \* \* \*